United States Patent [19] [11] 4,209,129
Haas et al. [45] Jun. 24, 1980

[54] COOLING MANIFOLD FOR MULTIPLE SOLENOID OPERATED PUNCHING APPARATUS

[75] Inventors: Robert G. Haas, Hopewell Junction; Charles V. Lent, Poughquag, both of N.Y.

[73] Assignee: International Business Machines Corporation, Armonk, N.Y.

[21] Appl. No.: 974,578

[22] Filed: Dec. 29, 1978

[51] Int. Cl.[2] .......... G06K 1/02; B26F 1/04
[52] U.S. Cl. .......... 234/108; 234/131; 83/169; 83/171; 165/142; 165/104 R
[58] Field of Search .......... 234/108-117, 234/131; 83/171, 169, 575; 165/142, 104 R

[56] References Cited

U.S. PATENT DOCUMENTS

| | | | |
|---|---|---|---|
| 3,080,110 | 3/1963 | Plaisance | 234/108 X |
| 3,182,905 | 5/1965 | Rabinow | 234/108 |
| 3,283,811 | 11/1966 | Harvey | 165/142 |
| 3,532,266 | 10/1970 | Guzak et al. | 234/108 |
| 3,907,026 | 9/1975 | Mangus | 165/70 |
| 3,924,675 | 12/1975 | Essebaggers | 165/134 |

OTHER PUBLICATIONS

IBM TDB, vol. 13, No. 9, Feb. 1971, p. 2536.
IBM TDB, vol. 16, No. 12, May 1974, p. 3933.
IBM TDB, vol. 20, No. 4, Sep. 1977, p. 1379.

*Primary Examiner*—Donald R. Schran
*Attorney, Agent, or Firm*—Wolmar J. Stoffel

[57] ABSTRACT

In a high density solenoid operated multiple punch apparatus, having a punch head provided with the plurality of closely-spaced large bores arranged in column and rows that extend partially through the punch head from the top side, solenoid elements mounted in the large bores, a plurality of holes with a diameter smaller than the large bores aligned with the large bores and extending the remaining distance through the punch head to the bottom side, push rod elements slidably disposed in the holes actuated by the solenoid elements, the improvement being A cooling system for the punch head which includes a plurality of small bores arranged in rows in the bottom of the punch head terminating short of the top surface and positioned in the area between the plurality of large bores, a plurality of elongated grooves in the bottom surface of the head located between rows of the plurality of holes and forming a recessed chamber connecting a row of the small bores, a plate seated in each of the elongated grooves with each plate separating the associated groove into a first manifold chamber located between the plate and the bottom of the groove and a second manifold chamber on the opposite side of the plate, tubes disposed in and extending through each of the plates with each tube concentrically located in one of the small bores, and openings to introduce liquid in one of the manifold chambers and remove liquid from the other manifold chamber.

8 Claims, 7 Drawing Figures

COOLING MANIFOLD FOR MULTIPLE SOLENOID OPERATED PUNCHING APPARATUS

DESCRIPTION

Technical Field

This invention relates to electronic packaging, more particularly to apparatus for forming holes in ceramic green sheet, which is used to form multi-layer ceramic substrates.

The object of the present invention is to provide a programmable punch apparatus for forming holes in ceramic green sheet material.

Another object of the present invention is to provide a liquid cooled manifold for a programmable punch apparatus for dissipating the heat generated by a plurality of closely spaced solenoid elements.

Another object of this invention is to provide a liquid cooled manifold for supporting a plurality of closely spaced solenoid elements that can be conveniently and inexpensively machined and has a minimum of plumbing conduits and fixtures.

BACKGROUND ART

In the manufacture of multi-layer ceramic (MLC) substrates for integrated circuit semi-conductor package structures, a plurality of ceramic green sheets are formed by doctor blading a slurry containing a resin binder, a particulate ceramic material, solvents and a plasticizer, drying the doctor bladed sheet and cutting it into appropriate smaller sized sheets. Via holes are then punched for forming electrical interconnections through the sheet, electrically conductive paste is deposited in the holes and in appropriate patterns on the surface of the sheets, the sheets are stacked and subsequently fired at a sintering temperature. The punching of via holes in a ceramic sheet presents formidable engineering problems in view of their small size and density. It is conventional to punch via holes with apparatus of the type disclosed in IBM TDB Vol. 13 No. 9, Feb. 19, 1971 P. 2536 or IBM TDB Vol. 16 No. 12, May 1974, P. 3933. In these apparatus a plurality of punch elements arranged in a grid are indexed over the green sheet which is covered by an interposer mask. The interposer mask contains openings where holes are desired to be punched. When a punch element contacts the interposer mask as the punch head is moved downwardly, a hole will be punched where the openings occur since the punch element will pass through the opening in the interposer mask and through the green ceramic sheet. In other areas covered by the interposer mask, i.e., where holes are not desired, the interposer mask will cause the punch element to be retracted into the head.

Such apparatus, while capable of punching complex hole patterns in green sheets, have disadvantages. The interposer mask necessary for operation is relatively expensive to form, it wears out in time since the carbide punches necessary for resisting wear in punching the ceramic expose the mask to significant wear. Further, variation in the MLC product model and design require a large inventory of masks in order to form the necessary patterns, and the extended time necessary for forming interposer masks reduces the capability of the system for making rapid changes.

Automated punch apparatus which utilize individually programmable punches have been suggested in IBM TDB Vol. 20 No. 4, September 1977, P. 1379. This type of punching apparatus does not require the afore-described interposer mask, since the individual punching elements can be activated electrically upon command. However, significant cooling problems have been encountered. The punch elements, which are activated by a solenoid, must be positioned close together in order to limit the area in which the punch head must be indexed over. The solenoids generate a very significant amount of heat since one coil in each solenoid is always on. The upper temperature operating limit in such an apparatus is relatively low because parts of the solenoids contain organic insulating material and the like which melts at relatively low temperatures. In view of the high density of heat generated, air cooling is not sufficient to dissipate the heat. It has been determined that liquid cooling is required. The necessity for closely spaced solenoids prohibits the machining or casting of a manifold with the conventional cooling fluid passages. Further, the limited space left between the solenoid elements is insufficient for any significant number of fluid passages and connections. Further, the punch head must be capable of disassembly in order to replace punch elements which wear out and/or break due to the abraisive nature of the ceramic green sheet material. Routine maintenance requirements dictate that the element should be readily disassembled without the need for disconnecting many conduits used for cooling.

BRIEF DESCRIPTION OF DRAWINGS

In the accompanying drawings forming a material part of this disclosure.

DISCLOSURE OF THE INVENTION

For further comprehension of the invention and of the objects and advantages thereof, reference will be had to the following description and accompanying drawings, and to the appendant claims to which the various novel features of the invention are more particularly set forth.

Before discussing the specific structure of the manifold of the invention, the various requirements and conditions present in the design of a multiple punching head involving programmable solenoids will be discussed. The diameter of a typical solenoid having sufficient strength to punch a hole in a green ceramic sheet far exceeds the spacing of holes in the green sheet itself. In order to punch closely spaced holes in a green sheet, either with an individually programmable punch of the type contemplated in this invention, or spring biased punch elements in combination with an interposer, the punch head is indexed such that each punch element covers an area approximately equal to a center to center distance of the punches in the head. In order to keep the indexing time to a minimum the punch elements in the head must be as closely spaced as possible. The closer the spacing, the smaller the areas that each punch must cover, and consequently, the less indexing time is required to cover all of the area where punched holes are desired in the green sheet. A suitable solenoid for punching green sheet has a diameter of approximately 0.38 inches. The closest that the bores of this diameter for receiving the solenoids that can be positioned for machining and strength considerations is of the order of 0.404 inches on centers. This leaves a web between the bores of only 0.024 inches. As can be appreciated, with the bores so closely spaced, it is impossible to cast the head with passages for circulating coolant fluid positioned between the bores. The length of the solenoid is of the order of 3½ inches. Experimentation has established that air cooling is insufficient to remove the heat generated by the solenoids. Further, it was discovered that even when using liquid cooling the coolant must remove heat from the center portion of the solenoid cluster. Use of a coolant liquid which contacts only one end of the solenoid was insufficient to remove the heat. The cooling manifold or head must preferably contain approximately 100 closely spaced solenoids, all generating heat since either the coil biasing the punch in the upward position or the coil biasing the punch in the downward position will be on at all times. Still further, practical maintenance requirements makes it desirable that defective solenoids can be easily removed, as well as bent or broken punch elements. Further the number of seals and plumbing conduits for circulating the coolant must be kept to a minimum.

Figure 1:
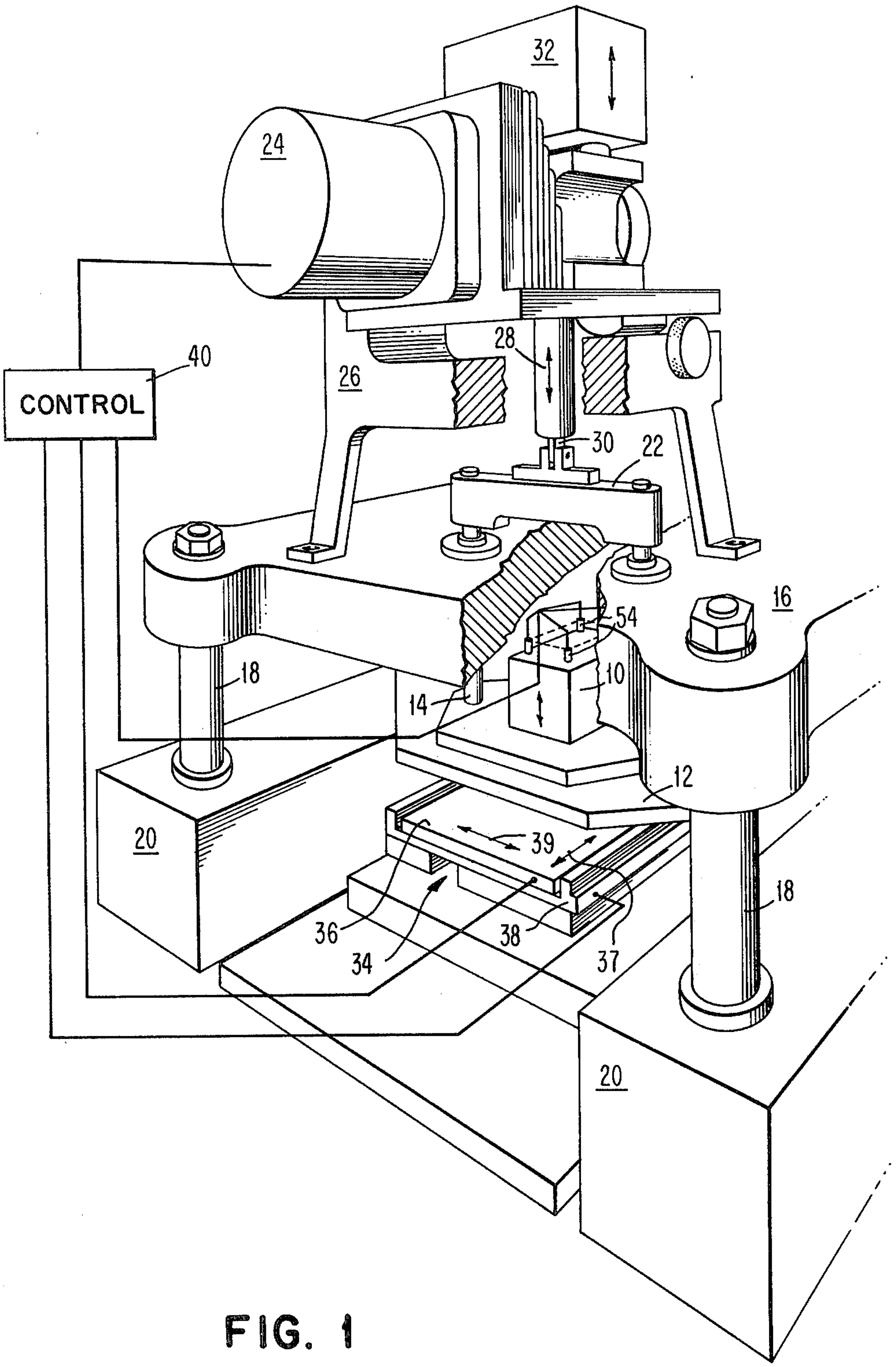
FIG. 1 is a perspective view in broken section illustrating the punch head cooling manifold for multiple solenoid punches of the invention mounted in a punch press for use in punching holes in ceramic green sheets.

Referring now to FIG. 1, the punch head and cooling manifold 10 is supported on support plate 12 which is in turn supported for reciprocal movement in the vertical direction. Support rods 14 are attached to support plate 12 and slidably mounted in platform 16, which is in turn mounted on support rods 18 in turn supported on base 20. The top ends of support rods 14 are attached to the cross bar 22 which is connected to driving motor 24 mounted on motor mount 26. Vertical movement is transmitted to the cross bar 22 by an excentric (not shown) connected to driving rod 28 connected to cross bar 22 through a flexible spring element 30. In order to minimize the vibration a counter weight 32 is provided which is also coupled to the shaft of driving motor 24. Weight 32 moves in the vertical but opposite direction than that of the punch head 10. On a table 34 there is provided a substrate support positioned directly beneath punch head 10. The substrate support, on which a green sheet is supported, has a mechanism which provides movement in both the X and Y directions. This permits the substrate mounted on the substrate support to be indexed beneath the punch head 10 as the punch head is reciprocated in the vertical direction to selectively punch holes. The mechanism for imparting the X and Y movement to the substrate support is shown schematically as a plate 36 which is movable in the direction indicated by arrow 37, and a second plate 38 which provides movement in the transverse direction as indicated by arrow 39. A suitable control 40 controls the indexing of the table, i.e., plates 36 and 38, the actuation of the solenoids 54 in punch head 10, and the timing of motor 24 which controls vertical movement of the punch head.

Referring now to FIGS. 2 thru 7, the specific structure of the punch head and manifold 10 will be described. The punch head 10 has a body portion 50 with a plurality of large bores 52 which receive solenoids 54. As more clearly indicated in FIG. 2 the solenoids 54 are very closely spaced for the reasons previously discussed. The body portion 50 is attached to a base 56. Aligned with the large bores 52 is a small hole or bore 58 having a threaded portion 59 (see FIG. 3). Solenoids 54 have a threaded extending portion 55 which engage threaded portion 59 of bores 58 thereby securing the solenoid to the punch head. The push rod 60 of solenoid 54 extends downwardly through small bore 58. Each of the solenoids 54 is also provided with a slot 57 (see FIG. 2) on the top which can be engaged with a screw driver or like tool to facilitate the removal of the solenoid. Holes 62 are provided in the corners of the base 56 so that the punch head can be secured by bolts 63 to support plate 12.

Figure 2:
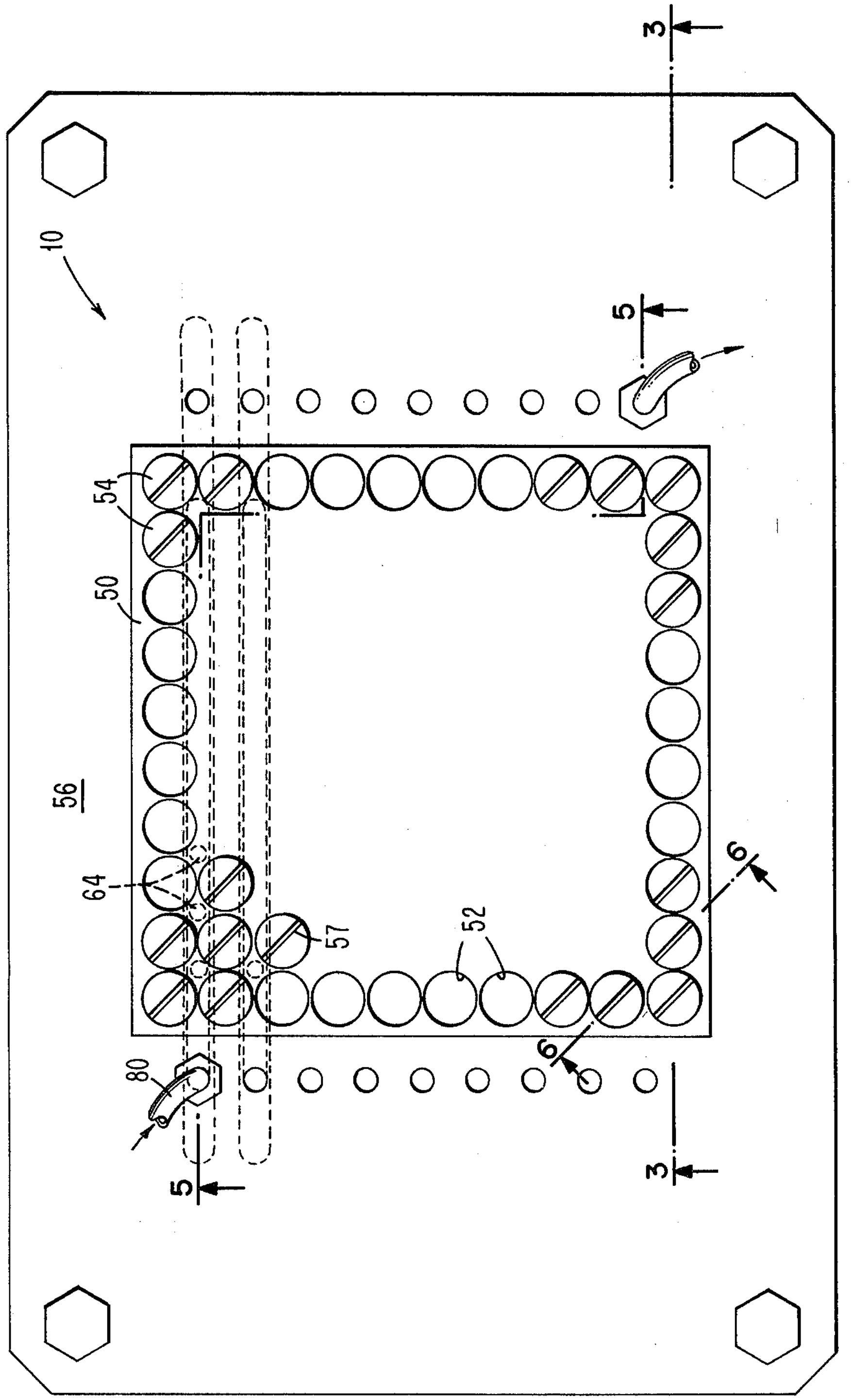
FIG. 2 is a top view of the cooling manifold of the invention.
Figure 3:
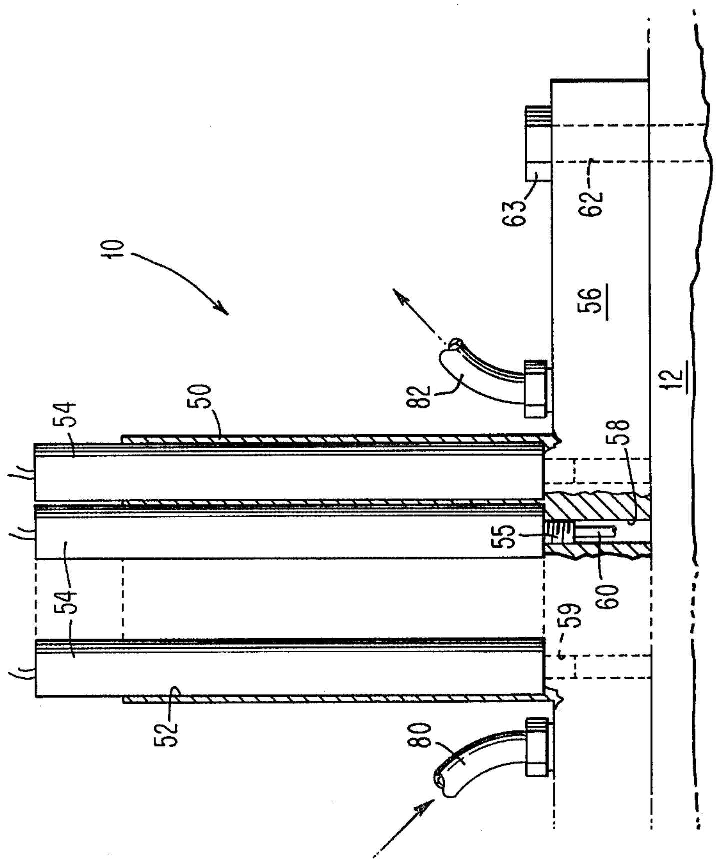
FIG. 3 is a side elevational view in cross section taken on line 3—3 of FIG. 2.
Figure 4:
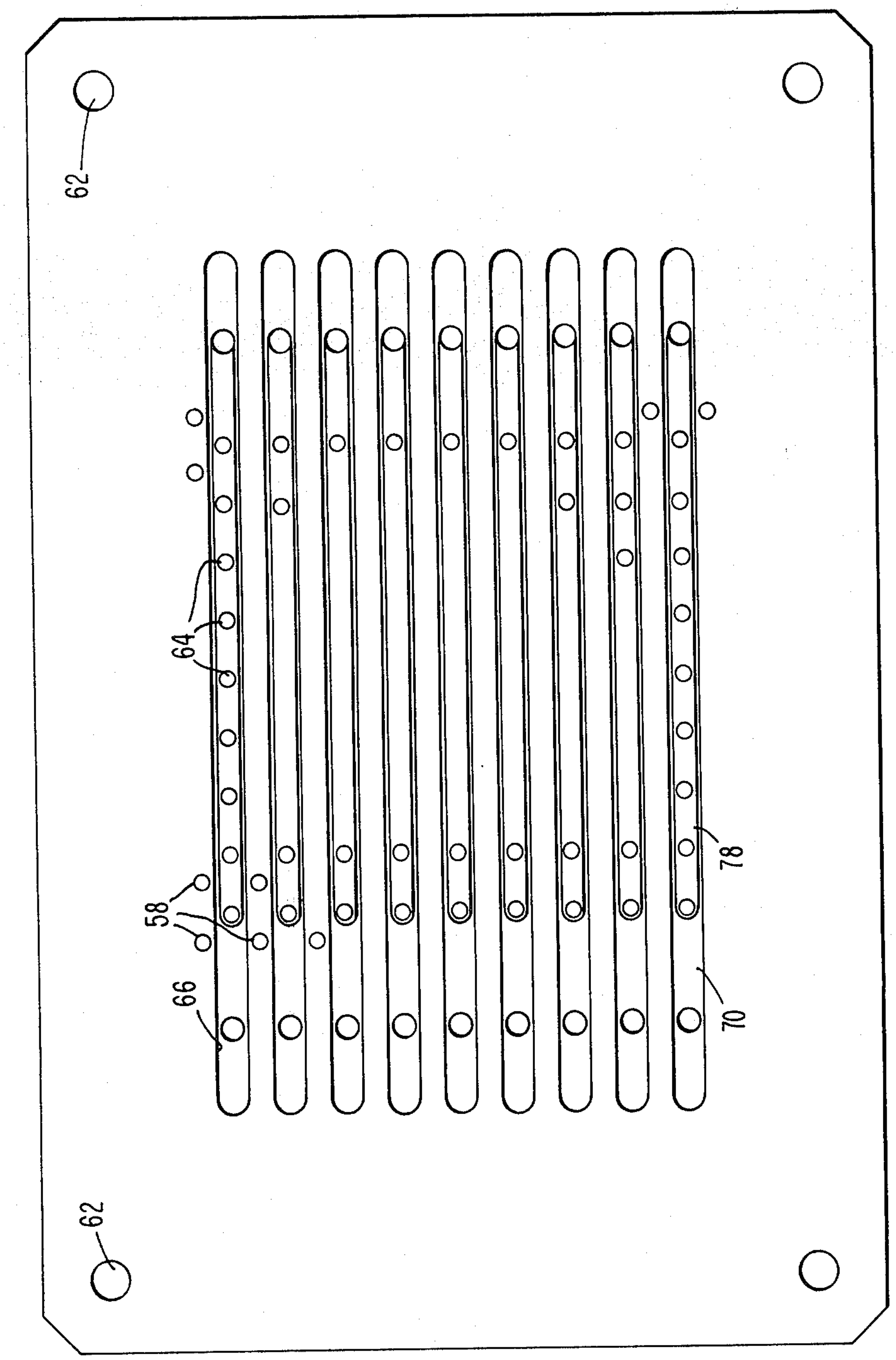
FIG. 4 is a bottom view of the cooling manifold shown in FIG. 2.
Figure 5:
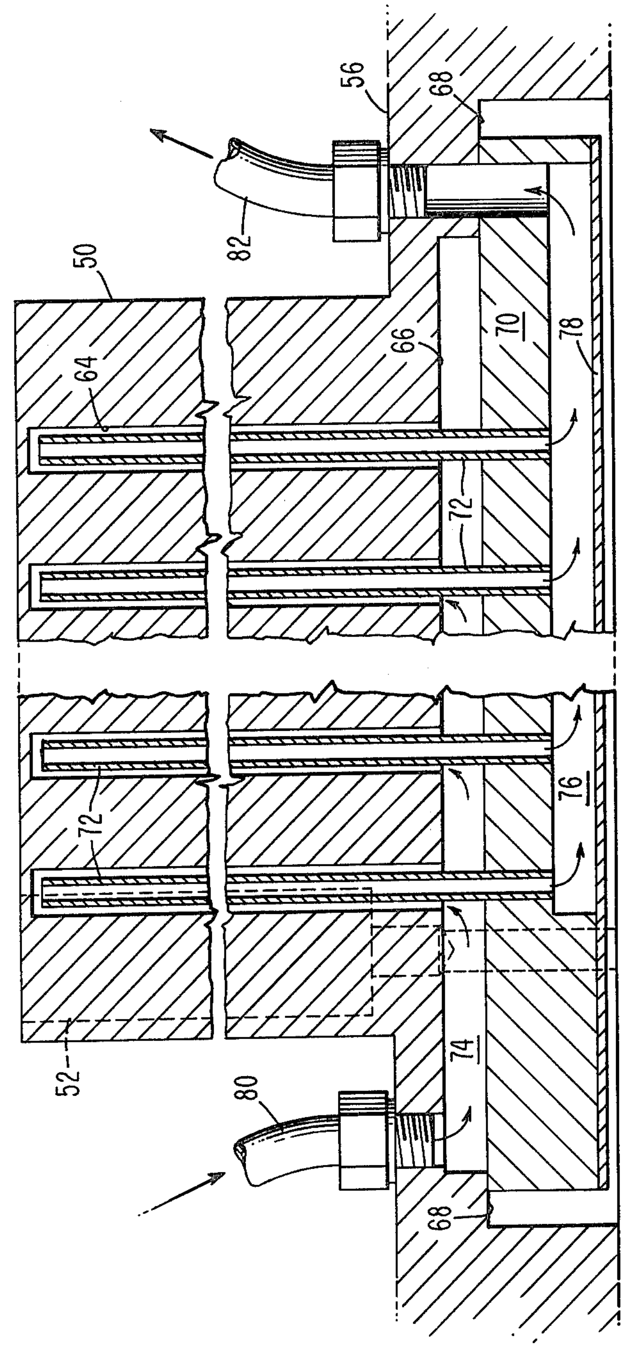
FIG. 5 is a side elevational view taken on line 5—5 of FIG. 2.
Figure 6:
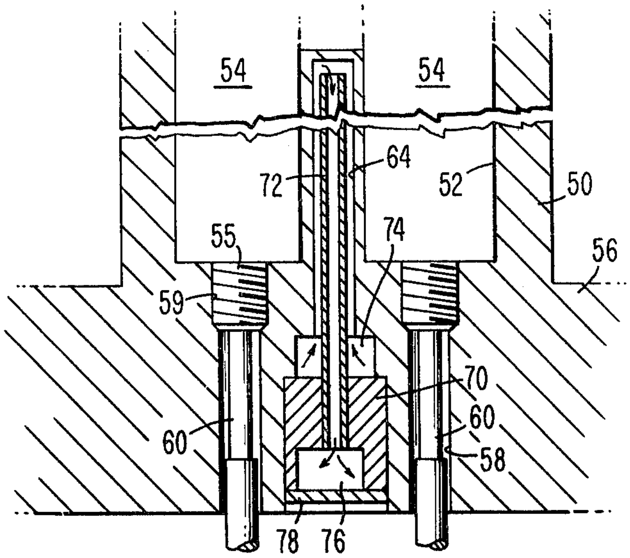
FIG. 6 is an elevational view taken on line 6—6 of FIG. 2.

As more clearly indicated in FIGS. 4, 5, and 6, a plurality of small bores 64 are made from the bottom side of punch head 10 and which terminate short of the top. Bores 64 are positioned between the large bores 52 as more clearly indicated in FIG. 2. Bores 64 will be used to circulate cooling fluid in the body 50 to thereby remove heat generated by the solenoids 54 along substantially their entire length. As indicated in FIG. 2 there is a sufficient amount of space between the bores 52 in the location indicated although the bores are spaced a very short distance in the X and Y directions. FIG. 6, taken on the diagonal on line 6—6 indicates the placement of bores 52. Subsequently elongated grooves 66 are machined in the bottom of base 56 which are positioned between the rows of bores 58 which receive the push rods 60 of solenoids 54. The position of the groove 66 in relation to the respective bores terminating at the bottom is most clearly shown in FIG. 4. Note that there is sufficient space between the rows of small bores 58 so that grooves 66 are aligned with the rows of bores 64 used for cooling purposes. Grooves 66, as most clearly shown in FIG. 5, each have a shoulder 68 on which a manifold plate 70 is placed in abutting engagement. Plate 70 has affixed thereto a plurality of tubes 72 which extend through plate 70 and up into small bores 64. The grooves 66 are thus divided into an intake manifold chamber 74 and an outlet manifold chamber 76. Plate 70 also is provided with a suitable recess which forms the outlet manifold chamber 76 as most clearly shown in FIG. 5. A cover 78 is disposed over the recess enclosing outlet manifold chamber 76. The plate and cover and the attached tubes 72 are secured in grooves 66 by a suitable adhesive as for example epoxy, although other means can be used to secure it in place and form a seal. Coolant fluid enters in manifold chamber 74 through inlet 80 and is forced upwardly under pressure into bore 64 between the tube 72 and the bores surface until it reaches the top of body 50. The fluid then returns to outlet manifold chamber 76 through the tube 72 and exits out of outlet 82.

Figure 7:
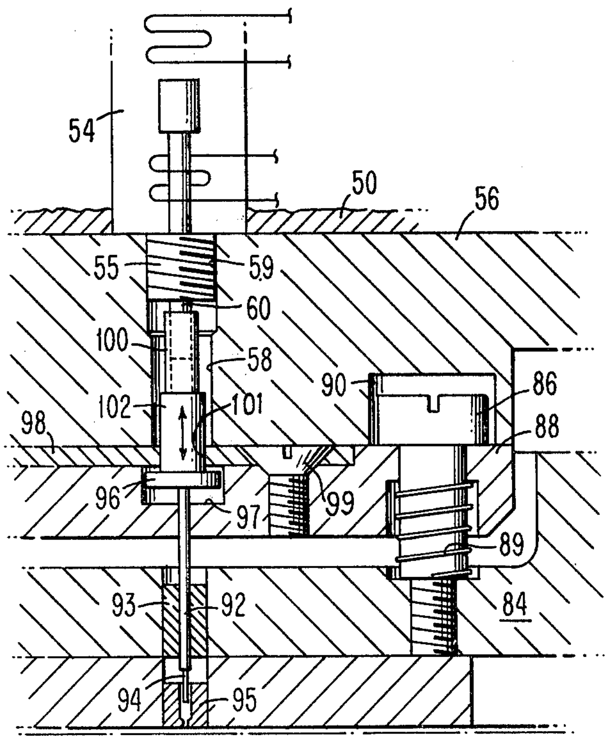
FIG. 7 is a side elevational view showing the relationship of a solenoid, the punch element and stripping plate of the punching apparatus of the invention.

Referring now to FIG. 7 there is depicted a preferred specific embodiment of a stripping plate and punch arrangement. A stripping plate 84 is secured to the punch head 10 which is biased in a downwardly or extended position. Bolts 86 are secured to the stripping plate 84 and extend through a plate 88 which is in turn secured to the bottom surface of the head by bolts not shown. A spring 89 positioned about bolt 86 urges stripping plate 84 in a downwardly or extended position.

Upward pressure on plate 84 in use will compress spring 89 forcing the bolt 86 upwardly where the head will retract into recess 90. The punch element 92 is slidably seated in bearing 93 with an elongated carbide punching portion 94 aligned with insert 95. On the opposite end of punch 92 is an enlarged or headed portion 96 located in a recess 97. A cover 98 secured to plate 88 by bolts 99 maintains the punch elements 92 in assembled relation since the headed portion 96 is larger than the aperture 101. On the end of shaft 60 of solenoid 54 is secured an intermediate extension 100. On the end of extension 100 is provided a magnet 102 which attracts and holds the enlarged head 96 of the punch element 92. In the event that a punch element 92 becomes damaged, it is necessary to replace same. The replacement of the punch element 92 is a relatively easy operation since the head can be removed from the press apparatus by removing bolts 63 (see FIG. 3) and any fluid cooling connections 80 and 82. The stripper plate 84 and plate 88 can then be separated from the punch head 10, the cover 98 removed and the punch element 92 lifted out and replaced with a new one. The magnetic coupling between magnets 102 and head portion 96 of punch element 92 facilitates separation of the stripper plate assembly from the punch head 10.

In operation a ceramic green sheet to be punched is placed on the substrate support and secured thereto by any suitable means. The control 40 then proceeds to index the punch head 10 over the green sheet and simultaneously control the solenoids 54 to selectively extend or retract the punch elements 92. When a hole is to be punched in the green sheet the control 40 causes the solenoid 54 to extend the shaft 60 thereby pushing the punch element 92 downwardly. The punch elements that have been extended by the solenoids then extend beyond the surface of stripper plate 84 and pierce the green sheet forming a hole. However, punch elements that have not been extended by solenoid 54 are located so that the end of the ends are within stripper plate 84 and do not form holes in the green sheet. Thus by controlling the position of the punch elements with solenoids 54, any desirable hole pattern can be formed in the green sheet. The cooling manifold in the punching head 10 of the invention will efficiently dissipate the heat generated by the closely spaced coils in solenoids 54 permitting continuous operation of the apparatus.

While we have illustrated and described the preferred embodiments of our invention, it is to be understood that we do not limit ourselves to the precise construction herein disclosed and the right is reserved to all changes and modifications coming within the scope of the invention as defined by the appendant claim.

Having thus described my invention, what I claim as new, and desire to secure by Letters Patent is:

1. In a high-density solenoid operated multiple punch apparatus having a punch head provided with a plurality of closely spaced large bores arranged in columns and rows and extending partially through the punch head from the top side, solenoid elements mounted in the large bores, a plurality of holes with a diameter smaller than the diameter of the large bores aligned with the large bores and extending the remaining distance through the punch head to the bottom side, push rod elements of the solenoids disposed in the holes, the improvement comprising:

a cooling system for the punch head which includes a plurality of small bores arranged in rows in the bottom of the punch head terminating short of the top surface and positioned in the area between the said plurality of large bores, a plurality of elongated grooves in the bottom surface of the head located between rows of the said plurality of holes and forming a recessed chamber connecting a row of said small bores, a plate seated in each of the elongated rows with each plate separating the associated groove into a first manifold chamber located between the plate and the bottom of the groove and a second manifold chamber on the opposite side of the plate, tubes disposed in and extending through each of the plates with each tube concentrically located in one of said small bores, and means to introduce liquid in one of said manifold chambers and means to remove liquid from the other manifold chamber.

2. The punch head of claim 1 wherein each of said elongated grooves is provided with a recessed shoulder, and said plate is seated in abutting relation to said shoulder.

3. The punch head of claim 1 wherein said plate is provided with an elongated recess, and a cover plate is disposed over said elongated recess in said plate, and wherein the enclosed space forms said second manifold.

4. The punch head of claim 3 wherein said plate and said cover is secured and sealed in said elongated groove in said punch head with hardenable material.

5. The punch head of claim 1 wherein said means to introduce fluid is an inlet opening which communicates with said first manifold, and said means to remove fluid is an outlet opening which communicates with said second manifold.

6. The punch head of claim 1 wherein a base flange is provided for said punch head.

7. The punch head of claim 1 which further includes a stripping plate assembly.

8. The punch head of claim 1 wherein punch elements are mounted in said stripping plate assembly, and a magnetic coupling unit connects each of said push rod elements of said solenoids to each of said punch elements.

* * * * *